United States Patent [19]

Martinou et al.

[11] Patent Number: 4,886,585

[45] Date of Patent: Dec. 12, 1989

[54] ELECTROLYTIC PROCESS FOR APPLYING THIN SILVER COATINGS TO STAINLESS STEEL, PARTICULARLY IN BEARING RACES

[75] Inventors: Robert L. Martinou, Bry sur Marne; Michel M. Ruimi, Paris, both of France

[73] Assignee: Societe Nationale d'Etude et de Construction de Moteurs d'Aviation"S.N.E.C.M.A.", Paris, France

[21] Appl. No.: 267,273

[22] Filed: Nov. 4, 1988

[30] Foreign Application Priority Data

Nov. 5, 1987 [FR] France .................. 87 15338

[51] Int. Cl.⁴ .................. C25D 5/34; C25D 5/48
[52] U.S. Cl. .................. 204/23; 204/34; 204/35.1
[58] Field of Search .................. 204/23, 34, 35.1, 38.1

[56] References Cited

FOREIGN PATENT DOCUMENTS 937211 12/1955 Fed. Rep. of Germany .
1442506 5/1966 France .

OTHER PUBLICATIONS

Chemical Abstracts, vol. 102, No. 24, Jun. 17, 1985, p. 514.
Chemical Abstracts, vol. 97, No. 18, Nov. 1, 1982, p. 567.
Metal Finishing, vol. 48, No. 5, May 1986, pp. 35–38; J. B. Mohler, et al.

Primary Examiner—T. M. Tufariello
Attorney, Agent, or Firm—Oblon, Spivak, McClelland, Maier & Neustadt

[57] ABSTRACT

In an electrolytic process of silvering stainless steel parts having a hardness of at least 58 HRc, the parts are subjected to degreasing with a solvent and by electrolysis in an alkaline atmosphere before undergoing electrolytic attack in an acid atmosphere, Wood prenickeling, electrolytic neutralization and then electroytic silvering in two successive distinct operations, these being a presilvering operation in a cyanide bath such that the free KCN/metal Ag ratio is at least 15, and a silvering operation in a similar bath which also contains potash and in which the free KCN/metal Ag ratio is about 10 times lower than in the presilvering bath. The process enables thin, adherent silver coatings to be deposited in a consistent manner on stainless steel parts, such as ball or roller races, before applying a self-lubricating coating to the parts.

15 Claims, 1 Drawing Sheet

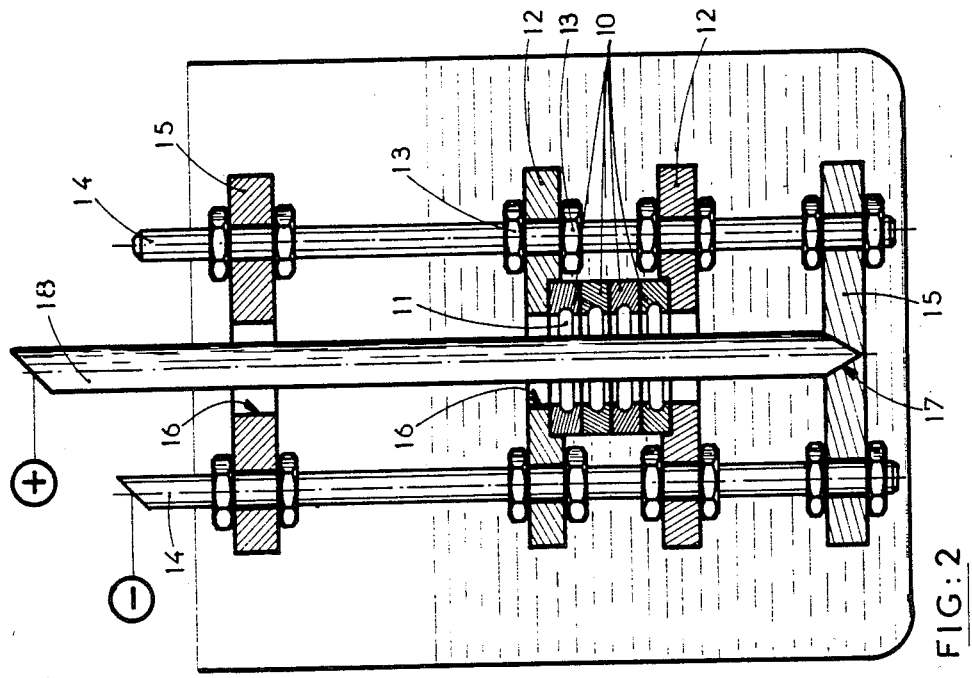
FIG:2
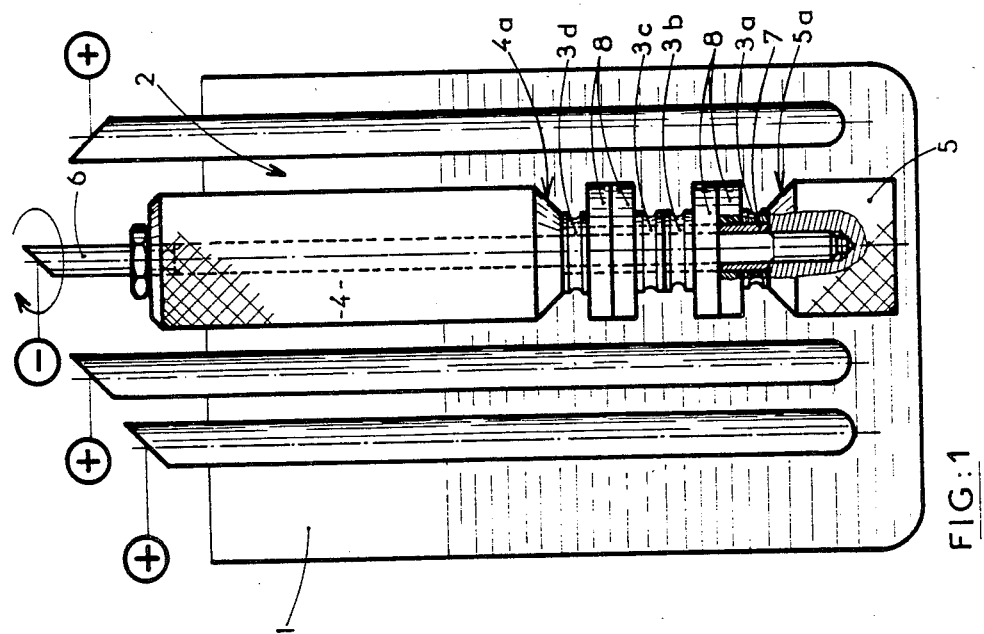
FIG:1

ELECTROLYTIC PROCESS FOR APPLYING THIN SILVER COATINGS TO STAINLESS STEEL, PARTICULARLY IN BEARING RACES

BACKGROUND OF THE INVENTION

1. Field of the Invention

The invention relates to a process for the electrolytic application of a thin silver coating of a thickness between 0.8 and 1.8 microns to stainless steel parts of the "bearing steel" type, for example Z100 CD 17 or E80CDV40 (AFNOR standard), i.e. very low deformation steels of hardness greater than 58HRc.

2. Summary of the Prior Art

In the silverplating of jewellery items it is known to apply the silverplating as a thick layer preceded by nickelplating. French Pat. No. 1,442,506 describes a process of this type. The conditions described for carrying out this process are not suited to the substrates to which the present invention relates. For example they specify preliminary nickel plating at a temperature from 40° to 60° C., a temperature at which bearing steels, which are very sensitive to high temperatures in hydrochloric surroundings, would experience the dissolution of their carbides. In addition, the implementation of the silverplating steps involves a preliminary silverplating under conditions such that the thickness of the pre-silverplating layer will have a tolerance of from 1 to 5 microns, whereas the thickness of the silverplating coating will be 30 microns.

Such a process is absolutely unsuitable for solving the problem addressed by the invention, which is to provide a very adherent silver coating on a bearing steel in a reproducible manner, the coating having a substantially uniform thickness not exceeding 1.8 microns.

In some applications of ball or roller bearings it is required that the bearings should be lubricated for life and not call upon external lubricants such as oils or greases, either because overall size constraints prevent the setting up of lubricating means, or because the environment does not allow the use of lubricating greases or oils because of the danger of contamination of the lubricant by the environment, or of the risks that the lubricant might create (for example when the bearings are used in atmospheres where a heated lubricant could cause a fire or an explosion).

In these applications, the avoidance of external lubricants has led to the provision of the races of roller or ball bearings with a coating layer having a very low friction coefficient, such as a coating including graphite or molybdenum bisulphide.

However, it has been found that such coatings, if applied directly to bearing steels, do not have a long service life because of their very low adherence to said steels. It has also been found that this adherence can be improved if the support is subjected to silver plating preliminarily to the deposition of the lubricating coating.

Thus, a standard silvering operation before the deposition of the lubricating coating comprises subjecting the parts to the following steps:

degreasing in a solvent bath;
electrolytic anodic degreasing in an alkaline atmosphere
electrolytic attack in an acid atmosphere;
chemical neutralization in a sodium carbonate bath,
silvering in an electrolytic bath of silver cyanide (1.2 g/l), potassium cyanide (37.5 g/l), sodium carbonate (22.5 g/l) and soda (37.5 g/l) for one minute at ambient temperature and a current density between 5 and 10 A/dm$^2$;
rinsing;
drying in air; and,
degassing in air at 130° C. for 2 hours.

It has been observed, however, that ball bearings which have undergone such a treatment before the lubricating coating, if subjected to high stresses such as under substantial and rapid variation of rotational speed, or also sudden heating, tend to seize very quickly and thereby bring about the deterioration of the device in which they are incorporated. Analyses carried out on such seized bearings have identified various types of problems.

It was first of all realised that the silvering process such as described above does not enable a sufficiently substantial thickness of silver to be obtained.

Indeed, electrolysis at a high current density (above 5A/dm$^2$) with the silvering bath composition referred to above brings about a cathodic polarization (due to the sodium ions at high current density) which quickly becomes substantial and blocks the electrolytic silver deposition at a thickness which does not exceed 0.5 micron.

There was also observed, during silvering, a pronounced gas release which creates a risk of fatigue of the steel substrate due to hydrogen, a risk which is all the more significant as the silver thickness is restricted to 0.5 micron and does not provide an adequate barrier for preventing the diffusion of hydrogen into the substrate.

Moreover, air degassing at 150° C. of silver deposits of 0.5 micron causes unreliable adherence of the silver to the substrate, as evidenced by magnification analyses showing an oxidation of the silver deposit and points on the under-layer inducing a loss of adhesion.

The Chemical Abstract "Treatment of a Stainless Steel Strip Before Plating" from Furukawa Electric Co. (Vol. 102, 1985–211 592 g) describes effecting a deposition of silver to a thickness of 1 micron on ferritic stainless steel sheets by plating nickel in a hydrochloric atmosphere, then pre-silvering at 3 A/dm$^2$ for 10 seconds, and finally silvering at 0.5 A/dm$^2$ for 3 minutes. Such a process is not easily usable on an industrial scale for the purpose of the present invention, which is to make a layer of very small thickness (below 1.8 microns) in a reproducible manner. A pre-silvering time of 10 seconds is difficult to reproduce industrially in a regular manner since it is such a short period, and the slightest time variation brings about a substantial variation of the pre-silvering thickness by virtue of the high current density used. In addition, with such a current density, the silver underlayer will be rough and can only lead to a poor final silvering result.

It is therefore an object of the invention to provide an industrial silvering process which avoids these drawbacks and makes it possible to obtain, reproducibly, silver deposits of a thickness between 0.8 and 1.8 microns, which are substantially uniform over the surface to be covered, and are very adherent and do not lead to hydrogen fatigue or loss of ductility of the coated part.

It is also an object of the invention to facilitate the production of an adherent and durable deposit of an anti-friction material such as molybdenum bisulphide or graphite on ball or roller bearing races by first providing the race with a suitable silver coating.

SUMMARY OF THE INVENTION

According to the invention there is provided a process for the electrolytic application of a thin silver coating layer of a thickness between 0.8 and 1.8 microns on a stainless steel part having a hardness of at least 58HRc and a low deformation tendency, said process comprising subjecting said parts to the following successive steps:

(a) degreasing in a solvent bath;
(b) anodic electrolytic degreasing in an alkaline atmosphere;
(c) anodic electrolytic attack in an acid atmosphere;
(d) an intermediate step of additional preparation;
(e) electrolytic neutralization;
(f) electrolytic presilvering in a presilvering bath containing silver cyanide (Ag CN), potassium cyanide (KCN), and potassium carbonate ($K_2CO_3$) in proportions such that the free KCN/metal Ag ratio is greater than 15; and,
(g) electrolytic silvering proper in a silvering bath containing silver cyanide, potassium cyanide, potassium carbonate, and potash in proportions such that the free KCN/metal Ag ratio of the silvering bath is about 10 times lower than that of the presilvering bath.

Preferably the presilvering bath comprises from 3 to 3.5 g/l AgCN; from 60 to 80 g/l free KCN; and at least 10 g/l $K_2CO_3$, and said presilvering step (f) is carried out at ambient temperature and a current density of $1\pm0.2$ A/dm$^2$ for $30\pm2$ seconds.

Preferably the silvering bath comprises from 40 to 75 g/l AgCN; from 50 to 90 g/l free KCN; at least 10 g/l $K_2CO_3$, and 5 to 10 g/l KOH, and said silvering step (g) is carried out at a temperature of $35°\pm2°$ C. and a current density between 1 and 1.2 A/dm$^2$ for a period of from 50 to 90 seconds$\pm2$ seconds, depending on the geometrical shape of said part to be silvered.

The process in accordance with the invention preferably also includes rinsing and drying steps after the silvering step, as well as an important subsequent step of degassing in a neutral atmosphere to avoid the danger of hydrogen fatigue.

The process in accordance with the invention is particularly suitable for improving the friction resistance of ball or roller bearings by silvering the races of the inner and outer rings of the said bearings. After silvering, the races may also be provided with an adherent layer of a lubricating material such as molybdenum bisulphide or graphite.

BRIEF DESCRIPTION OF THE DRAWINGS

FIG. 1 shows a cathodic assembly for the electrolytic silvering of inner bearing rings of ball bearings; and, FIG. 2 shows a cathodic assembly for the electrolytic silvering of outer bearing rings of ball bearings.

DESCRIPTION OF THE PREFERRED EMBODIMENTS

The invention will be described, by way of example, with reference to embodiments wherein the parts to be coated were either the inner and outer bearing rings of ball bearings, or cylindrical test pieces of 20 mm diameter and 10 mm thickness of highly resistant steel Z100CD17 (AFNOR standard).

In the case of the bearing rings two types of assembly were used, depending on whether inner or outer rings were to be coated.

FIG. 1 shows the assembly used for the inner rings. This assembly comprises an electrolysis tank 1 and a cathodic assembly 2 including four rings 3a, 3b, 3c, 3d to be coated, of unit surface area equal to 6.25 sq. cm., stacked between two cylindrical non-conductive elements 4,5, e.g. of PVC, and clamped by a nut screwed on a central conductive threaded rod 6 connected to a source of cathodic current. Over the height of the rings to be coated a conductive spacer 7 of Z 10 CNT 18 steel (AFNOR standard) is disposed between the cathode 6 and the bore of the bearing rings. The non-conductive cylindrical elements 4 and 5 are chamfered respectively at 4a, 5a adjacent their contact with the rings to be coated so as to prevent at this location any accumulation of gas adverse to the adherence of the coating on the ring area adjacent each non-conductive element 4 or 5. In addition, intermediate rings 8 of a material identical to that of the rings 3a-3d to be coated are alternated with the latter to act as "current stealers" for preventing possible over-thickness of the coating. Good results were obtained using three anodes evenly distributed in the tank 1 at 120° intervals around the central cathodic assembly 2, and by rotating the cathodic assembly about its longitudinal axis.

FIG. 2 shows the assembly used for silvering the inner races 11 of the outer bearing rings 10. The tests were carried out with four rings 10 of unit area equal to 10 cq. cm. clamped coaxially together between two conductive metal rings 12 of Z10CNT18 held in position by nuts 13 screwed on threaded conductive rods 14 of which at least one is connected to a source of cathodic current. The best results were obtained using four evenly distributed cathode rods 14. Two Plexiglas rings 15 also clamped by nuts to the rods 14 help to maintain the spacing of the rods 14. The conductive rings 12 and the top insulating ring 15 each have a central bore 16, whereas the bottom insulating ring 15 has a central conical recess 17 for the anode rod 18 which extends through the bores 16 and the rings 10. The whole of this assembly may be arranged to rotate in the electrolysis tank.

The silvering operations carried out using these two assemblies were as follows:

(a) The bearing rings were first degreased in a solvent bath, for example of trichloroethane.

(b) The rings were then subjected to electrolytic anodic degreasing for one minute at ambient temperature with a cathode of Z10CNT18 (AFNOR standard) stainless steel in a bath having the following composition:

Soda (Na OH): 37.5 g/l
Sodium carbonate: (N 22.5 g/l
Sodium cyanide: (Na CN) 37.5 g/l The current density was 5 A/dm$^2$, which corresponded to an intensity of $1.25\pm0.2$ A for the outer rings, and to an intensity of $2\pm0.2$ A for the inner rings.

Following this treatment the rings were thoroughly rinsed with running water.

(c) The rings were then subjected to electrolytic anodic attack in an acid bath comprising:
phosphoric acid ($H_3PO_4$, d=1.7): 986 g/l
sulphuric acid ($H_2SO_4$, d=1.84): 458 g/l
$H_2O$: 60 g/l
glycerol: 138 g/l The attack was carried out for 10 seconds at ambient temperature using a lead cathode and at a current density of 5 A/dm$^2$ (i.e. an intensity of $1.25\pm0.1$ A for the outer rings and an intensity of $2\pm0.1$ A for the inner rings), the attack being followed by copious rinsing with running water.

(d) After these cleaning steps, the rings were subjected to an intermediate step of additional preparation. This consisted of a prenickeling step, termed Wood pre-nickeling, to achieve a very fine deposit of active adherent nickel, while permitting depassivation of the metal surface onto which the nickel is deposited. This pre-nickeling is carried out in a bath containing 240 g/l nickel chloride ($NiCl_2,6H_2O$) and 36 g/l hydrochloric acid (HCl d=1.16) for 4 minutes at ambient temperature and with a current density of between 6 and 8 $A/dm^2$, preferably 7 $A/dm^2$ (corresponding to intensities of 1.75±0.1 A and 2.8±0.1 A for the outer and inner rings repsectively).

(e) The rings were then subjected to a step of electrolytic neutralization based on potash-cyanide so as to activate the surface and provide a medium compatible with the subsequent silvering bath. In prior processes using chemical neutralization, surface activation is uncertain. In contrast, in the process of the invention, activation is even and contributes to obtaining maximum adherence of the silver coating subsequently deposited, this being due to the mechanical action of surface effervescence produced during the electrolytic process. This neutralization was performed at ambient temperature for 30 seconds in a bath comprising 40 g/l, potassium cyanide (KCN) and density of about 1 $A/dm^2$, i.e. an intensity of between 0.25 and 0.30 A for the outer rings and between 0.40 and 0.45 A for the inner rings.

Neutralization was also followed by rinsing the rings with running water.

The rings thus prepared were then subjected to the silvering treatment which, in accordance with the invention, was carried out in successive steps, without intermediate rinsing of the rings.

(f) The first step, presilvering, was carried out at ambient temperature for 30 seconds (±2 seconds) at a current density of 1 $A/dm^2$ (corresponding to an intensity of between 0.25 and 0.30 A for the outer rings, and between 0.40 and 0.45 A for the inner rings) in a bath comprising:

Silver cyanide (Ag CN): 3 g/l
Potassium cyanide (KCN): 75 g/l
Potassium carbonate ($K_2CO_3$): 10 g/l This operation was carried out with mechanical stirring of the bath, and the rings were already at the cathodic voltage when introduced into the presilvering bath in order to prevent any chemical displacement of the silver deposit which would otherwise have little adherence.

(g) The second silvering step, i.e. silvering proper, was carried out immediately afterwards in a similar bath also containing potash, the constituents being present in the following proportions:

AgCN: 50 g/l
KCN: 84 g/l
$K_2CO_3$: 10 g/l
KOH: 10 g/l

This silvering step was carried out at a temperature between 33° and 37° C. and a current density of 1 $A/dm^2$, i.e. .025 to 0.30 A for the outer rings and 0.40 to 0.45 A for the inner rings, and for a period of 50 seconds (or 90 seconds)±2 seconds.

The amounts of the various components of the presilvering and silvering baths are calculated such that the free KCN/metal Ag ratio in the presilvering operation (f) is greater than 15 and the said ratio in the silvering operation (g) is about 10 times lower. The combination of the two separate and successive operations with this condition, as required by the invention, is the outcome of a number of experiments which showed that in this way the displacement of non-adherent chemical silver particles at the time of the introduction of the parts into the bath is avoided, and that as a result there is achieved an exclusively electrolytic deposition of metallic silver which adheres very strongly to the previously nickeled surface.

The silvering operation was followed by:

(h) rinsing the coated rings in running water;
(i) rinsing the rings in ethanol;
(j) drying the rings in compressed air; and
(k) degassing the coated rings in a neutral atmosphere (argon scavenging) for 10 to 15 hours at a temperature between 147° C. and 153° C.

The quality of the adherence of coatings formed by the process in accordance with the invention was verified by comparative stripping tests using adhesive tape, the tests being carried out by comparison with coatings formed by known processes as described earlier in the present specification. These tests are summarized in Table 1 and show that, with respect to the known process and to certain improvements of this known process, which were ineffective, only the process in accordance with the invention produces an adhering silver layer deposit.

Comparative tests were also conducted relating to the variation of mass, thickness and adherence after degassing. The tests concentrated on the influence of the silvering baths, the prenickeling bath, and the electrolytic anodic attack in relation to the thickness of deposits and their adherence before and after degassing at 150° C.

Table 2 indicates the results obtained, which show that:

The loss of material in electrolytic attack is not negligible, being 6 mg for a period of 10 seconds;

The mass of nickel deposited with a current density of 7 $A/dm^2$ over 4 minutes is 6 mg on an average, a thickness of 0.38 micron, The silver bath used in the prior art process does not enable production of the required thickness of silver, the thicknesses measured being 0.2 micron at 5 $A/dm^2$, 0.5 micron at 3 $A/dm^2$, and 0.1 micron at 1 $A/dm^2$. These values are independent of the duration of the electrolysis as they stayed constant after 1.5 minutes of testing.

There is observed during silvering by the known process, a heavy gas release which may be damaging in that the danger of hydrogen fatigue is increased. The examination of the composition of the known silvering baths shows that cathodic polarisation, induced by sodium ions at high current density, quickly becomes substantial and blocks the deposition mechanism.

The presilvering and silvering baths used in accordance with the invention give satisfactory values, and the duration range for the electrolysis may be between 50 seconds and 1 minute 30 seconds.

The thicknesses calculated from the mass variation of the samples were checked on a few bearing rings and a good correlation was found.

The verification of the adherence of the silver deposits before and after degassing at 150° C. for 15 hours led to a very important observation. If adherence is satisfactory after deposition in accordance with the invention, degassing of silver deposits of about 0.5 micron thickness at 150° C. in air renders the adherence unstable. An examination at low magnification reveals an oxidation of the silver deposit and points of the underlayer which cause loss of adherence. On the other hand, if degassing is carried out with argon scavenging, the silver deposit remains very adherent and free from oxidation points. Consequently, degassing with argon scavenging was systematically applied to parts coated in accordance with the invention as soon as these results were established. Comparative tests on hydrogen fatigue are summarised in Table 3.

The tests were carried out so as to appraise the influence of the various steps of the process, on the one hand after deposition, and on the other hand after degassing. The text samples were broken by bending, in the initial state ($\alpha 0$) which corresponds to base 100, then after deposition ($\alpha 1$) and degassing ($\alpha 2$). The ratio $\alpha 1/\alpha 0$ or $\alpha 2/\alpha 0$ is the fatigue index of the material, which is representative of its loss of ductility. For bearing steel Z100CD17 values equal to, or greater than, 94% are regarded as non-fatiguing.

The known process without degassing is fairly fatigue-producing (loss of ductility 35%), and degassing for 2 hours at 130° C. in air is inadequate. Even after maintaining degassing for 15 hours at 150° C. the value of 90% is still below the acceptable limit.

Prenickeling has no influence on H2 charging, this point being of interest as hydrogen fatigue is observed in highly resistant steels such as 40CDV20, and 35NCD16.

Cyanide baths (neutralization, presilvering, silvering) causes fatigue but to a lesser extent than the prior art silvering bath, and a degassing of 12 to 15 hours in argon or in air ensures a return to the initial ductility.

The use of electrolytic attack in the process, which promotes good adherence of the deposit, results in a return of substrate ductility of 96% after degassing, whereas the ductility is restored to 100% when electrolytic attack is not carried out. This slight change of ductility is not to be ascribed to hydrogen fatigue but to an appreciable degradation of the microgeometric quality of the surface of the Z100CD17 substrate. Indeed, the various surface examinations carried out show that (anodic) electrolytic attack is the source of the surface micro-cavities resulting from the elimination of carbide particles touching the surface (stripping).

These results show that the invention is used successfully with bearing steels, on which it allows subsequent application of a very adherent layer of a lubricating material, such as graphite or molybdenum bisulphide.

TABLE 1

ADHERENCE OF COATINGS APPLIED TO BEARING STEEL Z100CD17

| NO. OF TEST | PROCESS | ADHESIVE TAPE |
|---|---|---|
| 1 | Prior art: Anodic degreasing 1 min, electrolytic attack 10 secs. and 5 A/dm$^2$, chemical neutralization by sodium carbonate Silvering for 1 min at 5 A/dm$^2$ in a single stage | Poor: stripping of the silver deposit |
| 2 | Same as test 1, but with chemical neutralization replaced by electrolytic neutralization potash cyanide 30 secs., 2 A/dm$^2$ | Inadequate: partial stripping of the silver deposit |
| 3 | Same as test 2, but with replacement of the sole silvering operation by the successive operations according to the invention presilvering 30 secs. 2 A/dm$^2$ silvering 1 min 1 A/dm$^2$ | Inadequate: partial stripping of the silver deposit |
| 4 | Same as test 2, but with addition of Wood prenickeling (4 min. 7 A/dm$^2$) before silvering as in prior art | Suitable: no removal of silver |
| 5 | Same as test 3, but with addition of Wood prenickeling at 7 A/dm$^2$ before presilvering | Good: no removal of silver |

TABLE 2

ADHERENCE AND MASS VARIATION OF COATINGS APPLIED TO BEARING STEEL Z100CD17

| Conditions of use of the baths | Mass Variation | Thickness microns | After deposition | ADHERENCE After degassing 15 h 150° C. air | 15 h 150° C. in argon |
|---|---|---|---|---|---|
| Prenickeling 7 A/dm$^2$, 4 min, | 5 to 7 mg 6 mg (5 values/9) | 0.32–0.44 0.38 | | | |
| Anodic degreasing 5 A/dm$^2$ 1 min + electrolytic attack 5 A/dm$^2$ 10 secs. | −6 mg | | | | |
| Silvering 5 A/dm$^2$ 1 min | 4 | 0.2 | good | | |
| in a bath 5 A/dm$^2$ 3 min | 3 | 0.17 | good | | |
| according 5 A/dm$^2$ 5 min | 3 | 0.17 | good | | |

TABLE 2-continued
ADHERENCE AND MASS VARIATION OF COATINGS APPLIED TO BEARING STEEL Z100CD17

| Conditions of use of the baths | | Mass Variation | Thickness microns | After deposition | ADHERENCE After degassing 15 h 150° C. air | 15 h 150° C. in argon |
|---|---|---|---|---|---|---|
| to the prior art | 3 A/dm² 2 min | 9 | 0.5 | good | Limit | |
| | 3 A/dm² 5 min | 9 | 0.5 | good | | Suitable |
| | 1 A/dm² 2 min | 2 | 0.1 | good | Inadequate | |
| Presilvering in accordance with the invention | 1 A/dm² 30 sec | 7 | 0.42 | good | limit | |
| Silvering in accordance with the invention | 1 A/dm² 1 min 30 secs | 28 | 1.36 | good | good | good |

NOTE:
The silver deposits were applied after prenickeling

TABLE 3
FATIGUE CAUSED BY HYDROGEN TO BEARING STEEL Z100CD17 WITH VARIOUS COATINGS

| PROCESS | DUCTILTIY VALUE % After coating $\alpha 1/\alpha 0$ | After degassing $\alpha 2/\alpha 0$ |
|---|---|---|
| According to prior art | 65 | 90: 15 h at 150° C. air |
| According to prior art | 65 | 83: 2 h at 130° C. air |
| Anodic degreasing + Wood nickeling 4 min, 7 A/dm² thickness ≃ 0.4 micron | 100-100 | |
| Anodic degreasing + electrolytic attack 5 A/dm², 10 secs. + Wood nickeling thickness ≃ 0.4 micron | 92 | 96: 15 h at 150° C. air |
| Anodic degreasing + Wood nickeling + electrolytic neutralization 30 secs, 1 A/dm² | 92-95 | |
| Anodic degreasing + Wood nickeling + neutralization + presilvering 30 secs, 1 A/dm² + silvering 1 min 30 secs, 1 A/dm² | 83 | 100: 15 h at 150° C. air |
| Anodic degreasing + electrolytic attack + Wood nickeling + neutralization + presilvering 30 secs, 1 A/dm² | 71-77 | 96: 12 h at 150° C. argon 96: 23 h at 150° C. air |
| As immediately above + silvering 1 min 30 secs 1 A/dm² | 72-70-76-72 | 96: 12 h at 150° C. argon 94: 15 h at 150° C. argon 95: 23 h at 150° C. air |

What is claimed is:

1. A process for the electrolytic application of a thin silver coating layer of a thickness between 0.8 and 1.8 microns on a stainless steel part having a hardness of at least 58 HRc and a low deformation tendency, said process comprising subjecting said parts to the following successive steps:
    (a) degreasing in a solvent bath;
    (b) anodic electrolytic degreasing in an alkaline atmosphere;
    (c) anodic electrolytic attack in an acid atmosphere;
    (d) an intermediate step of additional preparation consisting of Wood prenickeling;
    (e) electrolytic neutralization;
    (f) electrolytic presilvering in a presilvering bath containing silver cyanide (Ag CN), potassium cyanide (KCN), and potassium carbonate (K₂CO₃) in proportions such that the free KCN/metal Ag ratio is greater than 15; and,
    (g) electrolytic silvering proper in a silvering bath containing silver cyanide, potassium cyanide, potassium carbonate, and potash in proportions such that the free KCN/metal Ag ratio of the silvering bath is about 10 times lower than that of the presilvering bath.

2. A process according to claim 1, wherein said solvent bath in step (a) comprises trichloroethane.

3. A process according to claim 1, wherein said Wood prenickeling step is carried out in a bath containing nickel chloride and hydrochloric acid, at ambient temperature with a current density between 6 and 8 A/dm².

4. A process according to claim 1, wherein said electrolytic neutralization step (e) comprises subjecting said part to electrolysis at ambient temperature and low current density in a bath containing potassium cyanide and potassium carbonate.

5. A process according to claim 1, wherein said presilvering bath comprises from 3 to 3.5 g/l AgCN from 60 to 80 g/l free KCN, and at least 10 g/l K₂CO₃, and said presilvering step (f) is carried out at ambient temperature and a current density of 1±0.2 A/dm² for 30±2 seconds.

6. A process according to claim 5, wherein said presilvering step (f) includes placing said part under cathodic voltage prior to introduction of said part into said presilvering bath, and mechanically stirring said bath during said presilvering step.

7. A process according to claim 1, wherein said silvering bath comprises from 40 to 75 g/l AgCN from 50 to 90 g/l free KCN at least 10 g/l $K_2CO_3$, and from 5 to 10 g/l KOH, and said silvering step (g) is carried out at a temperature of $35°\pm2°$ C. and a current density between 1 and 1.2 $A/dm^2$ for a period of from 50 to 90 seconds$\pm2$ seconds, depending on the geometrical shape of said part to be silvered.

8. A process according to claim 1, further comprising the step of rinsing said part under running water after each of said steps (a) to (e), and wherein said silvering step (g) is carried out directly after said presilvering step (f) without rinsing said part therebetween.

9. A process according to claim 1, further comprising the following additional steps after said silvering step (g):
  (h) rinsing said part in running water;
  (i) rinsing said part in ethanol; and,
  (j) drying said part with compressed air.

10. A process according to claim 9, further comprising the step of degassing said part in a neutral atmosphere after said drying step (j).

11. A process according to claim 10, wherein said degassing step is carried out in argon for 10 to 15 hours.

12. A process according to claim 10, wherein said degassing step is carried out at a temperature between 147° C. and 153° C.

13. A process for improving the friction resistance of a ball or roller bearing, comprising the step of providing the races of the inner an outer rings of said bearing with a thin silver coating by means of a process according to claim 1.

14. A process according to claim 13, further comprising the step of providing said races with an adherent coating of a lubricating material after said silver coating.

15. A process according to claim 14, wherein said lubricating material is selected from molybdenum bisulphide and graphite.

* * * * *

UNITED STATES PATENT AND TRADEMARK OFFICE
CERTIFICATE OF CORRECTION

PATENT NO. : 4,886,585

DATED : December 12, 1989

INVENTOR(S) : Robert L. Martinou et al

It is certified that error appears in the above-identified patent and that said Letters Patent is hereby corrected as shown below:

Column 4, line 28: "10 cq. cm." should read

-- 10 sq. cm --;

line 52: "(N" should read

-- ($Na_2CO_3$) --.

line 53: "(Na CN) " should read

-- (NaCN) --.

Column 5, line 16: "repsectively" should read

-- respectively --;

line 31: after "and", please insert

UNITED STATES PATENT AND TRADEMARK OFFICE
CERTIFICATE OF CORRECTION

PATENT NO. : 4,886,585

DATED : December 12, 1989

INVENTOR(S) : Robert L. Martinou, et al

It is certified that error appears in the above-identified patent and that said Letters Patent is hereby corrected as shown below:

-- 10 g/l, potassium carbonate ($K_2CO_3$), and at a current--.

Signed and Sealed this

Second Day of July, 1991

*Attest:*

HARRY F. MANBECK, JR.

*Attesting Officer*  Commissioner of Patents and Trademarks